United States Patent [19]

Valdiserri et al.

[11] 4,302,383

[45] Nov. 24, 1981

[54] STABILIZED OLEFIN POLYMERS

[75] Inventors: Leo L. Valdiserri, Belpre, Ohio; Elyse M. Bullock, Parkersburg, W. Va.

[73] Assignee: Borg-Warner Chemicals, Inc., Parkersburg, W. Va.

[21] Appl. No.: 150,878

[22] Filed: May 19, 1980

[51] Int. Cl.$^3$ .......................... C08K 5/34; C08K 5/52; C09K 15/30; C09K 15/32
[52] U.S. Cl. .......................... 260/45.8 N; 252/400 A; 252/403; 260/45.7 PH; 260/45.8 NT; 260/45.8 R
[58] Field of Search .................. 260/45.8 N, 45.8 NP; 252/400 A

[56] References Cited

U.S. PATENT DOCUMENTS

| | | | |
|---|---|---|---|
| 4,101,506 | 7/1978 | Uhrhan et al. | 260/45.8 NP |
| 4,101,509 | 7/1978 | Ramey et al. | 260/45.8 NP |
| 4,105,627 | 8/1978 | Sekiguchi et al. | 260/45.8 AH |
| 4,110,306 | 8/1978 | Minagawa et al. | 260/45.8 NP |
| 4,111,901 | 9/1978 | Hechenbleikner | 260/45.8 N |
| 4,198,334 | 4/1980 | Rasberger | 260/45.8 NP |

*Primary Examiner*—John Kight, III
*Assistant Examiner*—R. A. White
*Attorney, Agent, or Firm*—Joseph Shekleton

[57] ABSTRACT

An olefin polymer composition containing a cyclic, hindered amine in combination with an organic phosphite ester. The composition is relatively stable in the presence of ultraviolet light.

20 Claims, No Drawings

STABILIZED OLEFIN POLYMERS

This invention relates as indicated to stabilized olefin polymers. More particularly it relates to a stabilizing composition which is effective in relatively small proportions to inhibit the deterioration of olefin polymers in the presence of ultraviolet light.

Ultraviolet light has a degradative effect on olefin polymers the severity of which is dependent on the particular polymer and the geographical location of exposure. The degradation may take the form of discoloration, loss of tensile and impact strength, distortion of initial flexibility, dimensional change, surface craze, cracking, powdering or increased electrical conductivity. All of these effects may result from the breaking of carbon-to-carbon bonds in the polymer chain followed by oxidation of the chain fragments.

It is well known that the addition of certain materials to an olefin polymer will impart a degree of stabilization to that polymer with respect to its resistance to the destructive forces of ultraviolet radiation. These materials, in one instance, function as preferential acceptors of incident ultraviolet radiation because they have a much higher affinity for such radiation than does the olefin polymer. It appears that they absorb harmful radiation and dissipate it as harmless energy. They thus form a protective shield for the polymer in which they are present.

U.S. Pat. No. 4,111,901 (Hechenbleikner) shows the stabilization of olefin polymers against deterioration in the presence of ultraviolet light by means of certain substituted pyrrolidines and pyrrolines. In each case the amino group is sterically hindered by adjacent lower alkyl groups.

U.S. Pat. No. 4,056,507 (Ramey et al.) shows ultraviolet stabilizers (for synthetic polymers) which have a six-membered nitrogen ring; the structure inclues a hindered amine group as above and the stabilizers are said (at column 4, line 9-19) to be useful in combination with "di- and tri-alkyl- and alkylphenylphosphites . . ."

U.K. Pat. No. 1,526,603 shows the thermal stabilization of polypropylene by bis-(2,4-ditertiarybutylphenyl)pentaerythritol diphosphite in combination with calcium stearate and tetrakis (methylene-3-[(3',5'-ditertiarybutyl-4'-hydroxyphenyl)propionate])methane.

U.S. Pat. No. 3,988,293 (Mills) shows the combined use of distearyl pentaerythritol diphosphite and 2-hydroxy-4-n-octoxybenzophenone to impart an enhanced thermal stability to polyolefins such as polypropylene.

The invention of the present application is a stabilizer composition effective in small proportions to inhibit the deterioration of olefin polymers in the presence of ultraviolet light comprising in combination (a) a five-membered nnitrogen ring compound having the structure AOCOR, ACOOR or ACONHR' where A is a 2,2,5,5-tetraalkyl pyrrolidine or pyrroline wherein the alkyl groups are lower alkyl, R is alkyl, alkOCOA or alkCOOA where alk is an alkylene residue of a dicarboxylic or dihydroxy compound, and R' is alkyl or alkNHCOA; or a salt thereof, and (b) an organic phosphite ester.

The above stabilizer composition is as effective, or more so, than an equal amount of the five-membered nitrogen ring compound alone. This is an important observation because of the relatively lower cost of the organic phosphite ester so that it makes available a much cheaper stabilizer composition of equal or increased effectiveness.

The olefin polymers contemplated herein include homopolymers and copolymers of monoolefins, preferably those monoolefins containing 1-4 carbon atoms. Illustrative examples include polyethylene (both low and high density, including ultra high molecular weight polyethylene), polypropylene, and polyisobutylene, EPDM polymers are also contemplated. Polypropylene is preferred.

The alkyl groups on the carbon atoms alpha to the amine groups in the above pyrrolidine or pyrroline compounds are lower alkyl groups, i.e., alkyl of 1-4 carbon atoms. Largely because of their ease of preparation those pyrrolidines are pyrrolines are preferred where these alkyl groups are all methyl. Otherwise, though, they may be the same or different methyl, ethyl, propyl and butyl groups.

The alkylene groups in these structure may be straight or branched chain and may contain 2 to 10 carbon atoms. Specific illustrative embodiments include ethylene, trimethylene, tetramethylene, hexamethylene, octamethylene, and decamethylene; propylene, 2-methyltrimethylene, 2-methyltetramethylene, 3-ethylpentamethylene, 2,4-dimethylhexamethylene and 3,5-dimethyloctamethylene.

Similarly, R and R' are alkyl groups of 1-17 carbon atoms, e.g., methyl, ethyl, propyl, hexyl, decyl, tridecyl, pentadecyl and heptadecyl.

A is as indicated either a 2,2,5,5-tetraalkyl pyrrolidine or pyrrline.

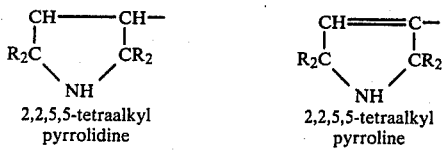

2,2,5,5-tetraalkyl pyrrolidine    2,2,5,5-tetraalkyl pyrroline where the R's are lower alkyl groups as above, i.e., having 1-4 carbon atoms. The R's may be the same or different.

Salts of the above substituted pyrrolidines and pyrrolines are also contemplated. These include both inorganic and organic salts including phosphates, carbonates, citrates, benzoates and aliphatic carboxylates having 10-20 carbon atoms.

The substituted pyrrolidines and pyrrolines herein may be prepared by known methods, as illustrated in the examples. Certain of these methods, are illustrated in the examples of the above Hechenbleikner patent. Other methods are taught in "Free Nitroxyl Radicals" by E. G. Rozantser, Plenum Press (1970).

The organnic phosphite ester of the stabilizer composition preferably is a pentaerythritol diphosphite which in most instances is characterized by a spiro structure, i.e.,

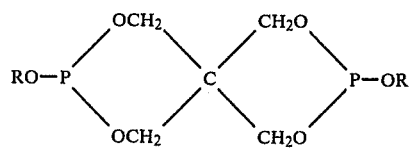

where R is an organic radical. Particularly preferred radicals (for R) are alkyl and alkylphenyl. When R is alkyl it should contain 10 to 20 carbon atoms, inclusive, and an especially desirable phosphite is distearyl pentaerythritol diphosphite; when R is alkylphenyl the alkyl substituents should contain 3 to 10 carbon atoms and, preferably, should be tertiary alkyl groups. Tertiarybutyl radicals are especially preferred. The alkylphenyl groups may contain up to three alkyl substituents. Another especially desirably phosphite is di-(2,4-ditertiarybutylphenyl)pentaerythritol diphosphite.

The phosphite esters may be made by a variety of methods. The dialkyl pentaerythritol diphosphites may be prepared by transesterification of diphenyl pentaerythritol diphosphite with the appropriate alcohol, e.g., stearyl alcohol or decyl alcohol. Alternatively, the same alcohol can be reacted with dichloro pentaerythritol diphosphite to give a product which is substantially pure spiro isomer; the transesterification product is a mixture of spiro and caged isomers. The di(alkylphenyl)pentaerythritol diphosphite may be prepared similarly, by either of the above methods. Other methods are known and described in the literature.

The relative proportions of the two additives of the stabilizer composition herein ordinarily are within the range of ratioes of 10:1 (five-membered nitrogen ring compound to organic phosphite ester) to 1:2. The concentration in olefin polymers of the stabilizer composition, i.e., the combined additives, should be within the range of from about 0.05% to about 2.0%. Preferably, the concentration is within the range of from about 0.1 to about 0.75%. Less than the indicated minimum is insufficient to provide the desired level of stability whereas more than the indicated maximum does not provide any substantial additional stability. The concentration of five-membered nitrogen ring compound (pyrrolidine or pyrroline) will be from about 0.1% to about 0.5%; the concentration of the organic phosphite ester will be from about 0.01% to about 1.0%.

The stabilizer composition of the invention may be used alone in polymer composition, but most usually it will be used in combination with other additives. These include metal soaps such as calcium, zinc, barium, cadmium, tin, magnesium and aluminum soaps, i.e., polyvalent salts of fatty acids. Also, phenolic antioxidants, fillers, pigments, antistatic agents, etc.

The effectiveness of the stabilizer composition herein is shown by the data set out in the Table below. Test samples are prepared by spinning 200/16 denier mutlifilaments from polypropylene compositions containing 0.05 phr (parts per hundred parts of resin) calcium stearate, 0.10 phr tris-(3,5-ditertiarybutyl-4-hydroxybenzyl)isocyanurate and the indicated amounts of phosphite ester and five-membered nitrogen ring compound. The initial tensile strength of the fibers is determined and then they are placed outdoors in Puerto Rico. The tensile strength is re-determined after 158 kilolangleys of outdoor exposure and the % loss of tensile strength calculated. The loss of tensile strength is of course a direct indication of the deterioration of the polypropylene fiber; the greater retention of tensile strength indicating a higher stability.

TABLE

|    | I[a]  | II[b] | III[c] | IV[d] | RATING |
|----|-------|-------|--------|-------|--------|
| 1. |       |       | 0.40   |       | 74%    |
| 2. |       |       | 0.20   |       | 48%    |
| 3. | 0.10  |       | 0.30   |       | 76%    |
| 4. | 0.05  |       | 0.35   |       | 79%    |
| 5. |       | 0.10  | 0.30   |       | 68%    |
| 6. |       |       |        | 0.40  | 64%    |
| 7. |       |       |        | 0.20  | 55%    |

TABLE-continued

|     | I[a]  | II[b] | III[c] | IV[d] | RATING |
|-----|-------|-------|--------|-------|--------|
| 8.  | 0.05  |       |        | 0.35  | 86%    |
| 9.  | 0.10  |       |        | 0.30  | 80%    |
| 10. |       | 0.05  |        | 0.35  | 88%    |
| 11. |       | 0.10  |        | 0.30  | 75%    |

[a] I Distearyl pentaerythritol diphosphite
[b] II Bis-(2,4-ditertiarybutylphenyl)pentaerythritol diphosphite

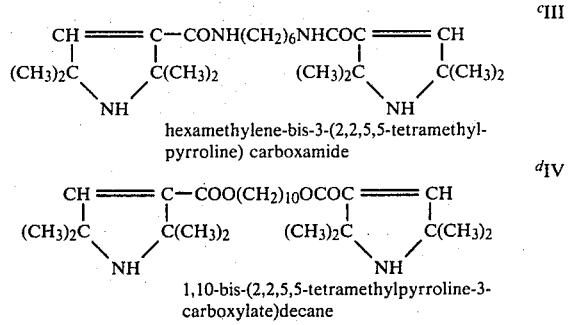

[c] III hexamethylene-bis-3-(2,2,5,5-tetramethyl-pyrroline) carboxamide

[d] IV 1,10-bis-(2,2,5,5-tetramethylpyrroline-3-carboxylate)decane

It will be seen, from a comparison of test sample results Nos. 1, 3 and 4, for example, that the substitution of a relatively inexpensive phosphite for a portion of the substituted pyrroline results in a fiber having substantially the same (actually, slightly improved) stability. Other similar comparisons are evident. See Nos. 6 and 11.

All parts and percentages herein, unless otherwise expressly stated, are by weight.

We claim:

1. A polymer composition comprising an olefin polymer in combination with each of (a) from about 0.3 to about 0.4 percent of a five-membered nitrogen ring compound having the structure AOCOR, ACOOR, or ACONHR' where A is a 2,2,5,5-tetraalkyl pyrrolidine or pyrroline wherein the alkyl groups are lower alkyl, R is alkyl, alkOCOA or alkCOOA where alk is an alkylene residue of a dicarboxylic or dihydroxy compound, and R' is alkyl or alkNHCOA; or a salt thereof, and (b) from about 0.05 to about 0.1 percent of an organic phosphite ester.

2. The polymer composition of claim 1 wherein the olefin polymer is polypropylene.

3. The polymer composition of claim 1 wherein the organic phosphite ester is a pentaerythritol diphosphite.

4. The polymer composition of claim 1 wherein the organic phosphite ester is a dialkyl pentaerythritol diphosphite.

5. The polymer composition of claim 4 wherein the alkyl groups each contain 10 to 20 carbon atoms.

6. The polymer composition of claim 1 wherein the organic phosphite ester is a di-(alkylphenyl)pentaerythritol diphosphite.

7. The polymer composition of claim 6 wherein the alkylphenyl groups are tertiarybutyl-substituted phenyl groups.

8. A stabilizer composition effective in small proportions to inhibit the deterioration of olefin polymers in the presence of ultraviolet light comprising in combination (a) from about 0.3 to about 0.4 parts of a five-membered nitrogen ring compound having the structure AOCOR, ACOOR, or ACONHR' where A is a 2,2,5,5-tetraalkyl pyrrolidine or pyrroline wherein the alkyl groups are lower alkyl, R is alkyl, alkOCOA or alkCOOA where alk is an alkylene residue of a dicarboxylic or dihydroxy compound, and R' is alkyl or alkNHCOA; or a salt thereof, and (b) from about 0.05 to about 0.1 part of an organic phosphite ester.

9. The stabilizer composition of claim 8 wherein A is 2,2,5,5-tetramethyl pyrrolidine.

10. The stabilizer composition of claim 8 wherein A is 2,2,5,5-tetramethyl pyrroline.

11. The stabilizer composition of claim 8 wherein the five-membered nitrogen ring compound is AOCOalk-COOA.

12. The stabilizer composition of claim 8 wherein the five-membered nitrogen ring compound is ACOHNR'.

13. The stabilizer composition of claim 11 wherein A is 2,2,5,5-tetraalkyl pyrrolidine.

14. The stabilizer composition of claim 11 wherein A is 2,2,5,5-tetraalkyl pyrroline.

15. The stabilizer composition of claim 12 wherein R' is alkyl.

16. The stabilizer composition of claim 8 wherein the organic phosphite ester is a pentaerythritol diphosphite.

17. The stabilizer composition of claim 8 wherein the organic phosphite is a dialkyl pentaerythritol diphosphite.

18. The stabilizer composition of claim 17 wherein the alkyl groups each contain 10 to 20 carbon atoms.

19. The stabilizer composition of claim 8 wherein the organic phosphite ester is a di-(alkylphenyl)pentaerythritol diphosphite.

20. The stabilizer composition of claim 19 wherein the alkylphenyl groups are tertiarybutyl-substituted phenyl groups.

* * * * *